INVENTORS
Philip Anthony Maunsell Gell
Douglas Graeme Hann
BY Kurt Kelman
AGENT

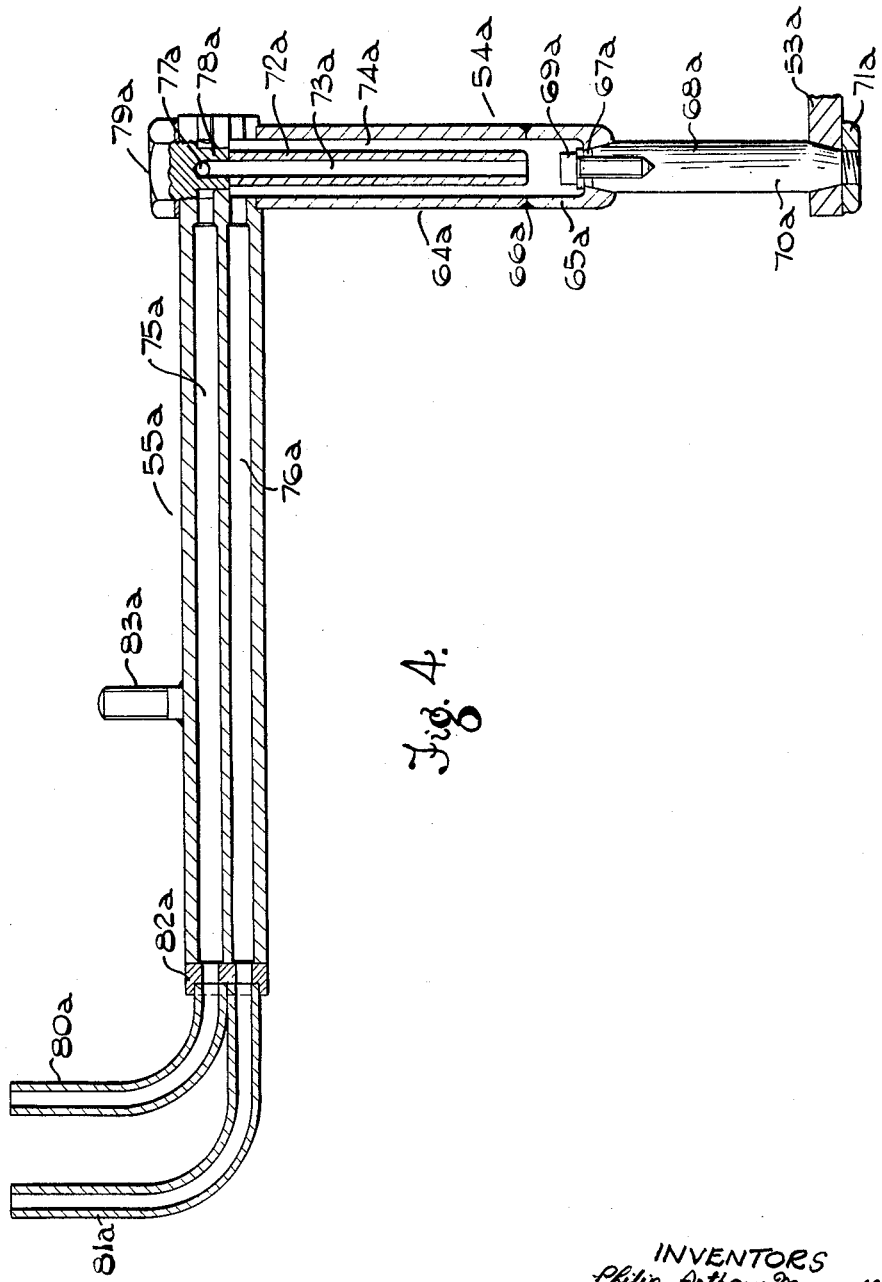

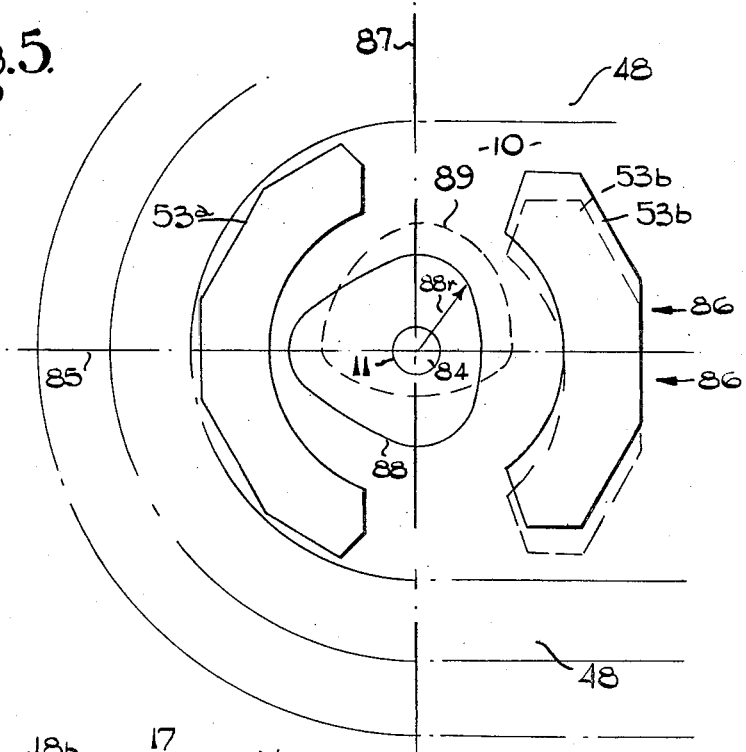
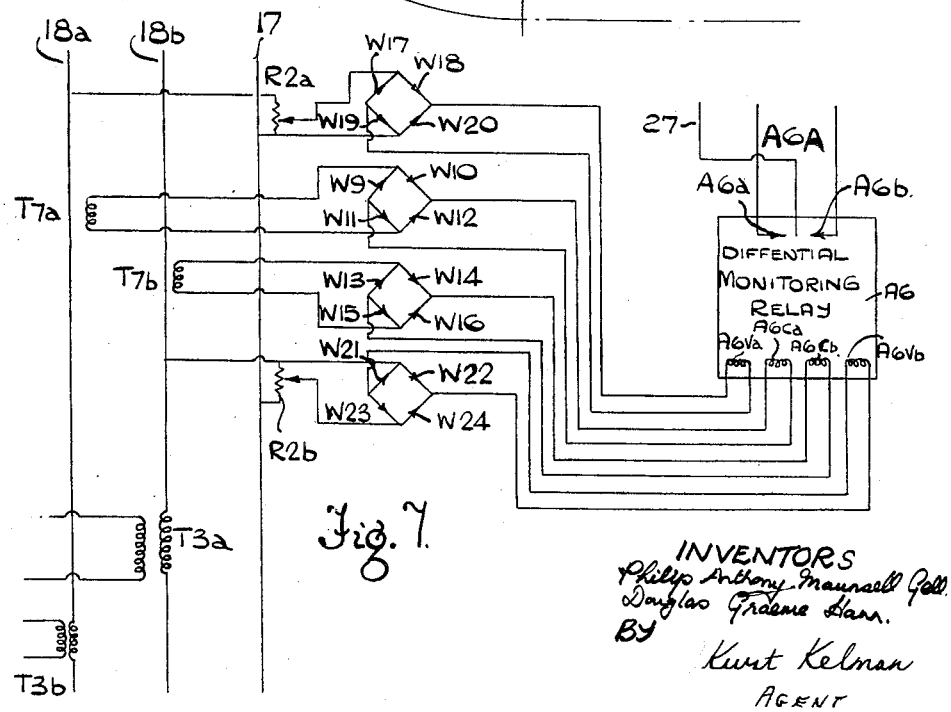

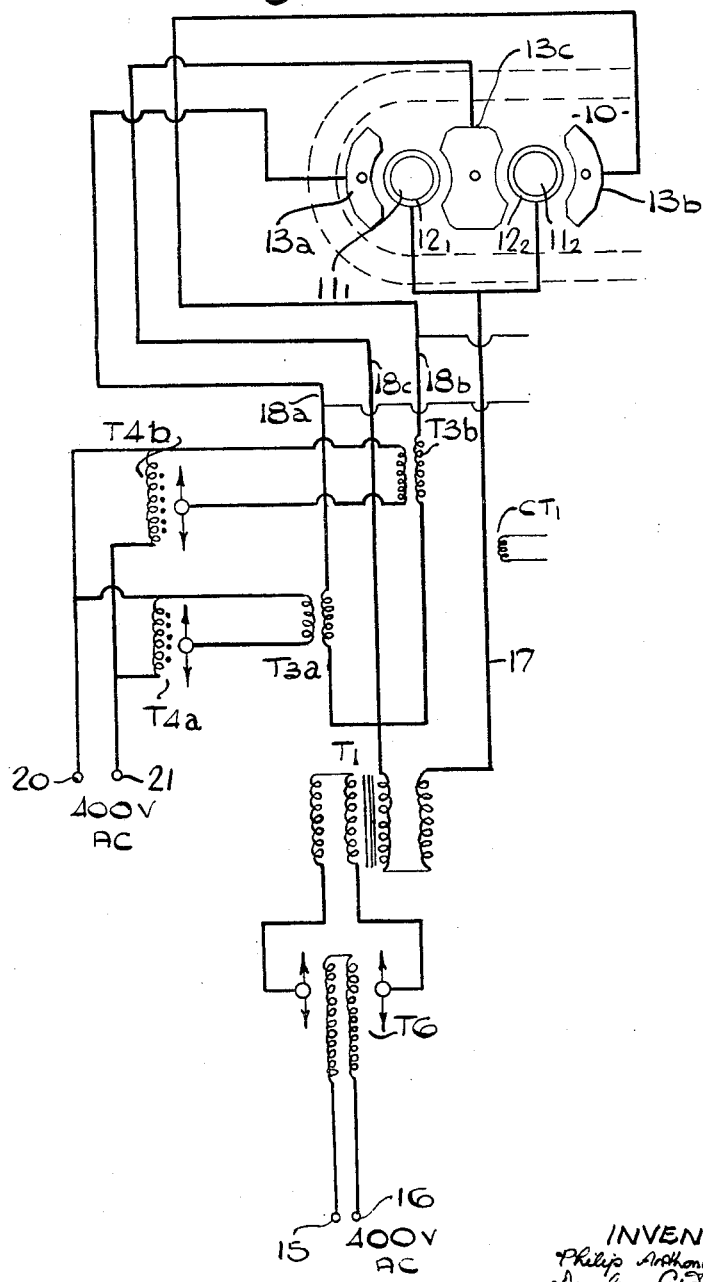

United States Patent Office 3,080,737
Patented Mar. 12, 1963

3,080,737
METHOD AND APPARATUS FOR HEATING GLASS PREPARATORY TO DELIVERY
Philip Anthony Maunsell Gell, Caynton, near Shifnal, and Douglas Graeme Hann, Beckbury, near Shifnal, England, assignors to Elemelt Limited, Bilston, England, a British company
Filed May 27, 1959, Ser. No. 816,249
Claims priority, application Great Britain May 30, 1958
10 Claims. (Cl. 65—128)

This invention relates to a method of and means for heating glass preparatory to delivery thereof from the oulet of a glass feeding furnace.

The expression "glass" as used herein is to be deemed to include vitreous materials generally. The expression "glass feeding furnace" used herein is to be deemed to include any chamber in which a quantity of molten glass is contained and from which such glass is delivered in discrete pieces termed "gobs."

It is important in many glass articles and in the performance of the methods by which they are produced that so far as possible the glass gob from which the article in question is shaped or made, shall initially, that is to say, at the instant of delivery from the glass feeding furnace be homogeneous as to the temperature of its different parts. In many cases it is inevitable that immediately upon delivery cooling will occur by the dissipation of heat from the outer surface of the gob, so that some temperature gradient will necessarily exist between the outer surface and the central region of the gob, but it is desired especially to avoid in the gob of glass the existence of certain zones occupying either a constant position or a varying position in relation to a reference axis (which for the purpose of convenience may be considered as passing through the centre of the outlet perpendicular to the plane thereof) which have a higher temperature or a lower temperature than the remainder of the gob.

If the gob or body of glass fed out from the glass feeding furnace does incorporate zones in which the glass is of a higher or lower temperature than the remainder of glass in the body, the proper formation of the article may be prejudiced by the contrast in viscosity, or possibly even if the article is successfully produced its mechanical strength and resistance to fracture may be impaired through internal stress, or other properties such as its optical properties may be impaired.

Furthermore, the existence of zones in which the glass has a higher or lower temperature than the remainder of glass in the body fed out from the feeding furnace may cause the body to be displaced to one side or the other of the reference axis in the course of delivery. This may lead to the malformation or articles in cases where the glass is delivered gravitationally to the apparatus by which the article is shaped, as for example, a pressing machine, or blowing machine or machine utilising a combination of blowing and pressing operations wherein the glass is delivered gravitationally to a mould.

One object of the present invention is to control the temperature gradient existing in a body of glass delivered from a glass feeding furnace which temperature gradient may be regarded as existing in a cross-sectional plane generally perpendicular to the delivery axis or path along which the body moves in the course of delivery from the furnace.

Yet another object of the invention is to enable proper control to be exercised over the temperature of molten glass contained within a glass feeding furnace in the vicinity of an outlet or a plurality of outlets and in particular at angularly spaced positions around a reference axis or axes extending through said outlet or outlets so as to minimise the risk of the setting up of asymmetrical temperature gradients in bodies of glass delivered from said outlet or outlets.

Yet another object of the invention applies particularly to the feeding of glass from a furnace chamber by means of a plunger reciprocated along a reference axis extending through an outlet of the furnace, and is directed to establishing in the working path of said plunger, and immediately adjacent thereto, control over the temperature of the molten glass and thereby to minimise any tendency for the expelled gob of glass to exhibit pronounced differences of temperature at positions spaced apart angularly about said reference axis.

Yet another general object of the invention is to provide an improved arrangement of electrode means in relation to the outlet of a glass feeding furnace and to provide electrical supply circuits for said electrodes to enable the foregoing objects to be attained.

Yet another object of the invention is to provide an improved method of feeding gobs of glass from a glass feeding furnace, such gobs having a controlled symmetrical temperature gradient in a cross-sectional plane generally perpendicular to a reference axis passing through an outlet in the bottom wall of a feeding chamber of said furnace.

The invention will now be described by way of example with reference to the accompanying drawings wherein:

FIGURE 4 is a fragmentary view in side elevation and in vertical cross section of one of the electrodes and its supporting means.

FIGURE 5 is a diagram showing a polar diagram of the current density distribution around a reference axis passing through the outlet of the feeding chamber and the manner in which this polar diagram may be varied.

FIGURE 7 is a fragmentary circuit diagram illustrating a modification of the circuit shown in FIGURE 6 providing for automatic variation in the magnitude of the current density as aforesaid, and FIGURE 8 is a further fragmentary circuit diagram illustrating a modification of the circuit shown in FIGURE 6 when this is applied to a feeding chamber having two outlets.

Figure 1:
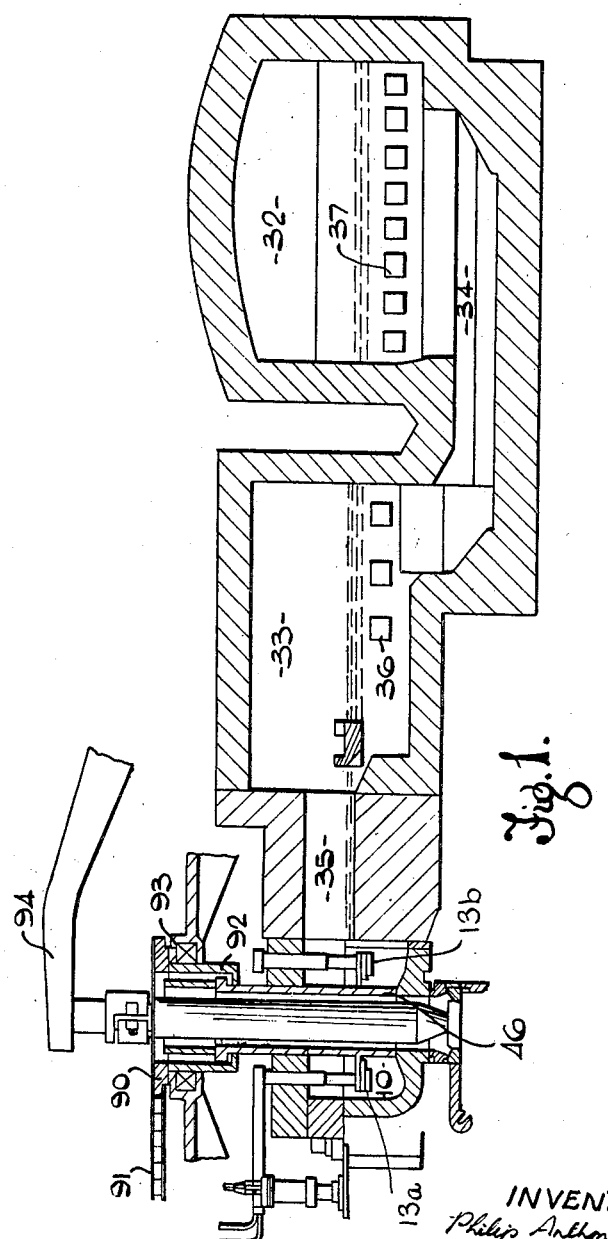
FIGURE 1 is a view in side elevation and in vertical cross section of one form of glass melting and refining furnace incorporating a feeding chamber and electrodes in accordance with the invention.

Referring firstly to FIGURE 1 the furnace therein shown comprises four main portions, these being a furnace chamber 32 in which glass batch materials in solid or divided form are melted and partly refined, a further chamber 33 connected to the furnace chamber 32 by way of a duct 34, a forehearth 35 serving to connect the further chamber 33, and a feeding chamber 10.

The chambers 32 and 33, the duct 34 and the electrode means 36 and 37 provided in these chambers for heating may be as described and claimed in our co-pending United States application, Serial No. 620,618, now Patent No. 2,899,476 but it will be understood that it is by no means essential that this particular arrangement of glass melting and refining chambers should be adopted, the glass delivered to the feeding chamber 10 being capable of being brought to a molten condition and a suitably refined state in any other way which need not necessarily involve heating the glass by the passage of alternating electric current therethrough.

Figure 2:
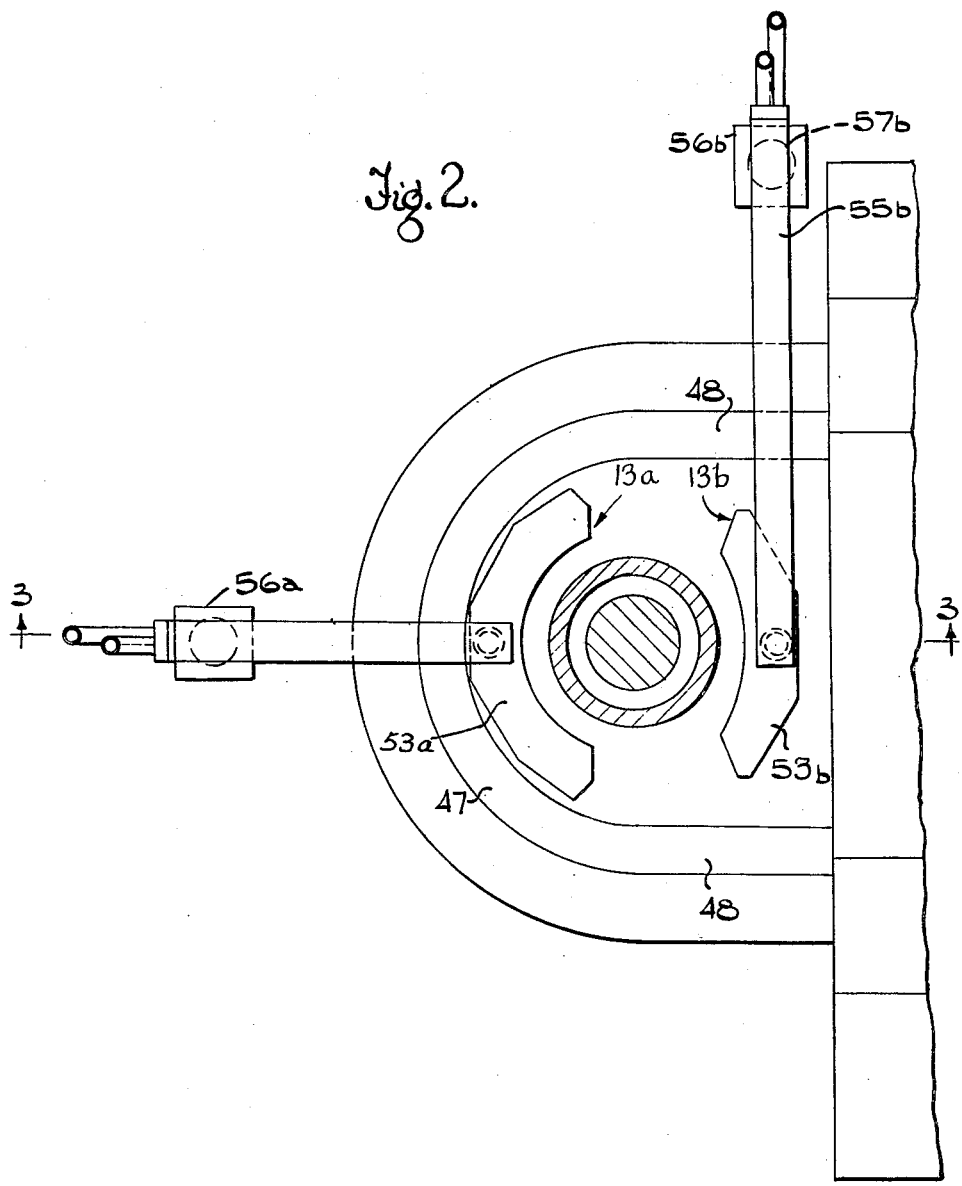
FIGURE 2 is a fragmentary plan view on an enlarged scale and with the top wall of the feeding chamber removed to show the electrodes operative therein.
Figure 3:
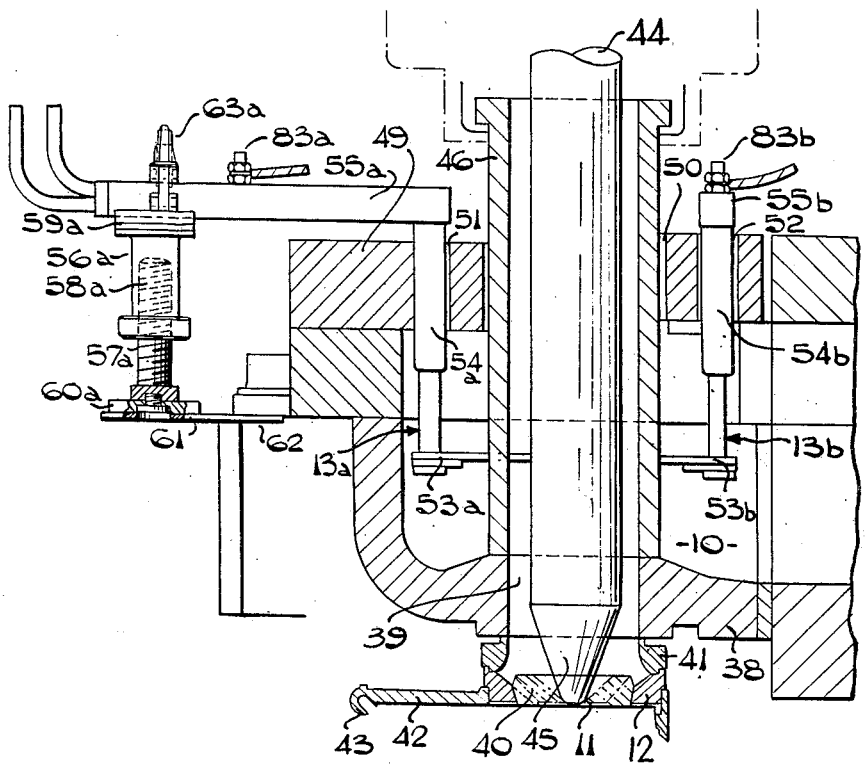
FIGURE 3 is a fragmentary view on an enlarged scale of the feeding chamber in side elevation and in vertical cross section on the line 3—3 of FIGURE 2.

Referring now to FIGURES 2 and 3 the feeding chamber itself comprises a bottom wall 38 in which is formed an opening 39 beneath which is disposed an outlet piece 40 conveniently of circular form and formed with an outlet opening 11, the piece 40 being carried by a ring-like electrode 12 which may be made of molybdenum. It will be observed that the outer boundary of the opening 39, which forms the outlet in the bottom wall of the furnace, is inset laterally from the side wall comprising the side wall portions 47, 48 hereinafter referred to, and the glass passing out of the outlet will, preparatory to such passage, have occupied an annular zone lying, for the most part, radially, outwardly of the outer boundary of the opening 39. Between the electrode 12 and the bottom wall 38 is provided a closure ring 41, all these parts being supported by a bracket 42 which serves also to convey electric current from a terminal portion 43 thereon to the electrode 12.

Within the feeding chamber 10 is disposed a plunger 44 which is adapted to be reciprocated vertically by a driving arm 94 (FIGURE 1) disposed coaxially with the outlet 11 and formed at its lower end with a frusto-conical portion 45 which, when desired, can be brought down to act as a closure member for the outlet 11, as seen particularly in FIGURE 3. It will be evident that because of the presence of the plunger 44 the glass will be excluded from a central core above the outlet 11 when the plunger is in its lowered position, and that upon raising the plunger segmental portions which go to make up the body of glass surrounding the plunger will collapse radially inwardly into the cavity formed by upward withdrawal of the plunger to form a gob which passes downwardly out of the outlet 11 upon the next downward movement of the plunger. It will thus be further evident that the temperature distribution within the gob thus formed is determined principally by the temperature of the segmental portions of the body of glass from which the gob was formed, control of which is achieved as hereinafter described in detail.

Surrounding the plunger 44 is a sleeve 46 which may be made of refractory material and which can be moved endwise between an inoperative lowered position in which it shuts off communication between the outlet 11 and the remainder of the feeding chamber 10 and an operative raised position in which it would be disposed with its lower end portion just beneath the surface of the glass in the feeding chamber. In its raised position the sleeve 46 controls the rate of flow of glass to the outlet opening 11. If desired, the sleeve 46 may be oscillated or rotated continuously when in its operative position to impart stirring motion to the glass in the feeding chamber with a view to promoting uniformity of temperature.

Suitable means for oscillating the sleeve may comprise a sprocket 90 driven by a chain 91, the sprocket having fixed to it a carrier bush 92 journalled in a bearing structure 93 and keyed or otherwise fixedly connected at its lower end to the upper end of the sleeve 46.

The side wall of the feeding chamber may comprise a portion 47 of semi-cylindrical form integrally connected with portions 48 which are parallel with each other, whilst the top wall 49 includes a central opening 50 for the passage therethrough of the plunger 44 and the sleeve 46 and further openings 51 and 52 for the passage therethrough of electrode supports, as hereinafter referred to more fully.

At a position above the ring-like electrode 12 which surrounds the outlet 11 there are disposed in the feeding chamber 10 two electrodes 13a and 13b.

These include electrode bodies 53a and 53b of plate-like form and generally segmental shape as best seen in FIGURE 2 carried at the lower end in each case of supporting stems 54a and 54b projecting downwardly through the openings 51 and 52 and each at its upper end connected with a horizontal stem portion 55a and 55b respectively. It will be evident from FIG. 2 that the faces of the electrode bodies 53a, 53b jointly extend over more than one-half of the circumference of an annular zone about the axis of the outlet 11.

The stem portions 55a and 55b are themselves supported by pedestals 56a and 56b adapted to enable the height of the associated electrode plate 53a and 53b as the case may be to be adjusted relatively to the ring-like electrode 12.

Thus, it will be evident from FIGURE 3 that in the case of the pedestal 56a this comprises a lower portion 57a in the form of an externally screw threaded post, and an upper portion 58a affording an internally threaded socket and terminating at its upper end in a cradle 59a for receiving the stem portion.

The post 57a may be mounted in such a manner that it can be rotated on its own axis relatively to a base 60a which is carried by a bracket arm 61 suitably supported from the wall structure of the feeding chamber at 62.

In association with cradle 59a there is provided a clamp 63a which can be released to permit the stem portion 55a to slide endwise, and similarly equivalent parts incorporated in the pedestal 56b permit the stem portion 55b to be slidden endwise as required.

Thus, the position of the electrode 13a can be adjusted both lengthwise of the reference axis passing vertically through the outlet 11 and radially to this reference axis in a direction parallel to the in-flow path of glass laterally to the feeding chamber 10 through the forehearth 35.

Similarly the electrode 13b can be adjusted in position lengthwise of the reference axis and crosswise of the in-flow path of the glass in which it is disposed.

The manner of mounting the electrode plates 53a and 53b of the electrodes 13a, 13b, is typically illustrated in FIGURE 4 showing the mounting for the plate 53a. These plates, may be made of molybdenum, although other metals might be employed in some circumstances for example tungsten or platinum.

The stem 54a comprises an upper hollow part 64a terminating at its lower end in a closure cap 65a conveniently welded thereto as indicated at 66a, both these parts being made of steel.

The closure cap is formed with an aperture 67a in its lower end in which is mounted the frusto-conical portion of a stud 68a forming the lower part of the stem.

This stud may be made of molybdenum and secured in the aperture 67a by means of a bolt 69a, the lower end portion 70a of the stud being also frusto-conical and received in a correspondingly shaped opening in the plate 53a in which it is secured by means of a nut 71a screwed on to the threaded end portion, as shown.

The hollow stem 64a is sub-divided in its interior by means of a tube 72a to provide an inner passageway 73a and an outer annular passageway 74a for the in-flow and return flow of a cooling fluid preferably in liquid form, e.g. water.

The horizontal stem portion 55a also affords in-flow and out-flow passageways 75a and 76a, the former being placed in communication with the passageway 73a by means of opening 77a in the spigot portion 78a of a hollow stud 79a screwed into the end of the stem portion 55a and carrying the tube 72a. The passage 76a communicates directly with the passage 74a.

At the outer end of the stem portion 55a separate tubes 80a and 81a are connected with the passageways 75a and 76a through the intermediary of a terminal bush 82a.

The stem portion 55a is also provided with a stud 83a welded or otherwise suitably secured thereto and serving to enable an electrical connection to be made thereto as seen particularly in FIGURE 3 wherein the corresponding parts are also shown in respect of the electrode 13b.

Referring now to FIGURE 5 this shows in plan a typical form of current density distribution around the reference axis 84. Heat loss from the body of glass melt contained in the feeding chamber 10 will normally be greatest adjacent to the end portion of the side wall on the longitudinal axis 85 of symmetry of the in-flow path indicated by the arrows 86 but on the side of the reference axis 84 remote therefrom. Heat loss will normally be at a minimum where the in-flow path enters the feeding chamber 10 and there will be an intermediate value of heat loss adjacent each of the side walls 48 on the transverse axis 87.

To make good this heat loss and maintain the glass in the feeding chamber at uniform temperature at all positions spaced angularly around the reference axis 84 a current density distribution would be required as shown typically by the full line 88 which is a polar diagram, the magnitude of the current density at any position being represented by the radius vector 88r.

It may happen, however, that due to some extraneous influence heat loss from one side wall 48 along the axis 87 is somewhat greater at one side than the other so that a symmetrical disposition of the electrode plate 53b, as shown in full lines, will not achieve the desired full line polar diagram 88 for current density distribution.

Moreover, the ratio of heat loss from the end wall of the feeding chamber remote from the in-flow path and forehearth may be somewhat greater in comparison with the rate of heat loss at the region at which the in-flow joins the feeding chamber, and these combined influences may result in the production of a distribution of current density represented by the polar diagram shown in broken lines at 89 and a correspondingly inhomogeneous temperature distribution.

In the embodiment of the invention now described various means are provided to enable a current density distribution in accordance with the polar diagram 88 to be restored.

One of these means is the mounting of the electrode 13b, namely the pedestal 56b and its associated clamp which permits the stem portion 55b to be adjusted endwise so that the electrode plate 53b can be brought into the position shown in broken lines.

This produces a shortening of the gap between adjacent ends of electrode plates 53a and 53b at the side at which the current density was formerly below its proper value, and a lengthening in the gap at the other side at which the current density was above its proper value, and tend to reduce the electrical resistance of the current path between the electrodes 13a and 13b considered collectively and the companion electrode 12 at the first side relatively to that existing at the second side, where formerly the current density was greatest, because the total area of electrode face presented at this last mentioned side is now reduced compared with that presented at the side where the gap is reduced.

Figure 6:
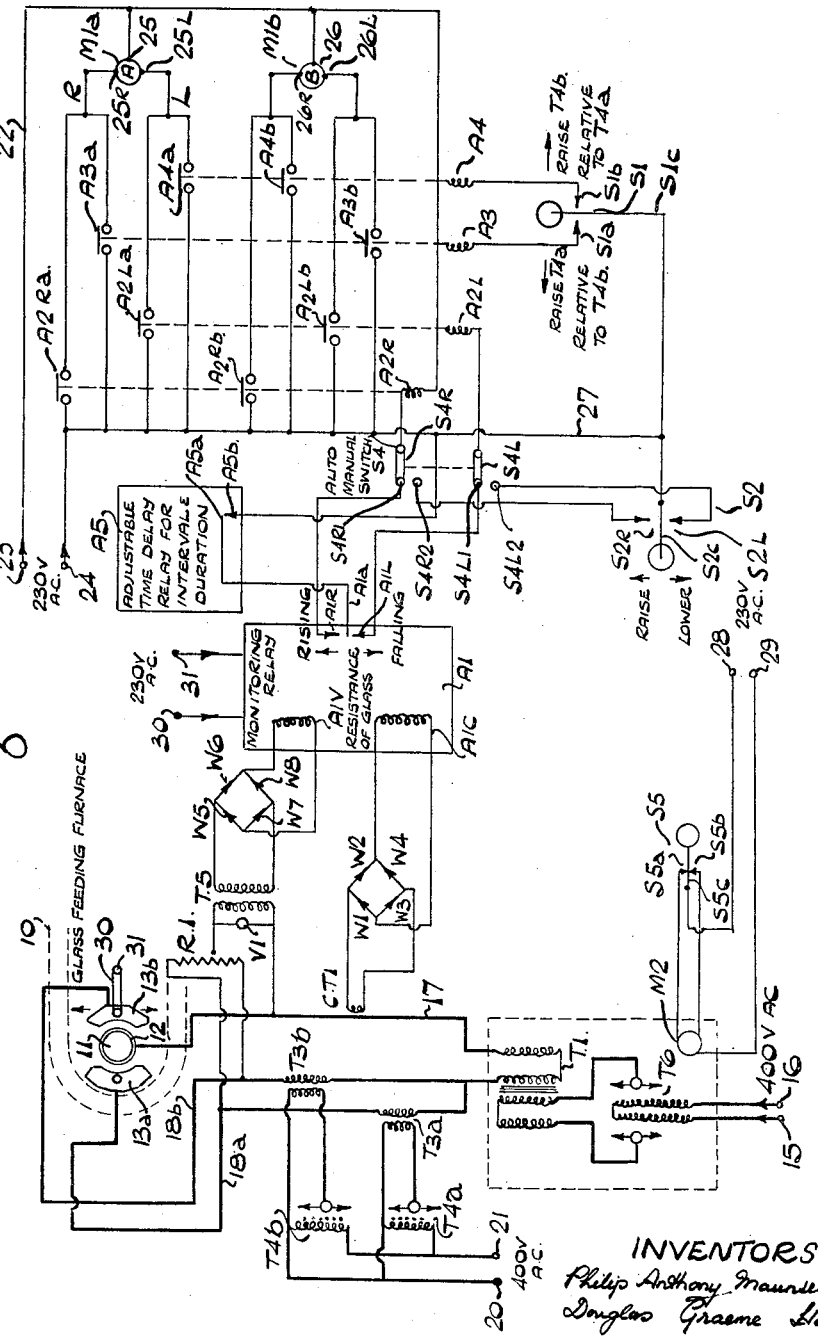
FIGURE 6 is a circuit diagram of the supply circuit for the electrodes in the feeding chamber arranged to permit of manual adjustment of variation in the magnitude of current density in one segment of the current path relatively to another segment thereof.

The second expedient which in the apparatus now described may be utilised for correcting departure from the desired relative values of current densities along the axis 85 lies in certain features of the supply circuit as shown in FIGURE 6.

For this purpose the electrodes 13b and 12 on the one hand are treated as one companion pair of electrodes fed with a supply voltage of selected value, and the electrodes 13a and 12 are treated as another companion pair of electrodes and are fed with another selected voltage, the value of voltage in each case being determined by measuring an electrical quantity pertaining to the current path on the one hand between the companion pair of electrodes 13b and 12, and on the other hand between the companion pair of electrodes 13a and 12 and adjusting the voltage applied between the electrodes of these companion pairs accordingly.

The electrical supply for feeding the electrodes may comprise a single phase alternating current supply applied at terminals 15 and 16 through a variable auto-transformer T6 to a main input transformer T1 of which one terminal of the secondary winding is connected directly to the electrode 12 through the conductor 17.

The other terminal of the secondary winding of transformer T1 feeds the two electrodes 13a and 13b respectively through conductors 18a and 18b, the former including in series the secondary winding of an auxiliary transformer T3a, and the latter including in series the secondary winding of an auxiliary transformer T3b.

The primary winding of the transformers T3a and T3b are fed from terminals 20 and 21 connected to the same single phase supply. Between the transformer T3a and the terminals 20 and 21 is operatively connected a variable auto-transformer T4a, and a second auto-transformer T4b is operatively connected between these terminals and the transformer T3b thus permitting the voltage applied to the primary winding of each of the transformers T3a and T3b to be independently adjusted.

The auto-transformers T4a and T4b are each adjustable to provide a variable output voltage by means of a mechanical adjusting member, which could be manually operated but is preferably operated, in each case, by an associated reversible electric motor, these being indicated at M1a and M1b respectively. The motors M1a and M1b are arranged to be energised automatically to cause them to adjust transformers T4a and T4b respectively in the appropriate directions to correct any departure from the desired level of dissipation of electrical energy in the segmental current path extending between the companion electrodes 13a and 12, and dissipated in the segmental current path between the companion electrodes 13b and 12.

For this purpose a monitoring relay A1 is provided having a current winding A1c and a voltage winding A1v. The winding A1c is connected to the secondary winding of a current transformer Ct1 through the intermediary of a bridge circuit rectifier w1—w4. The voltage difference between the electrodes 13a and 13b on the one hand and the electrode 12 on the other hand is determined by connecting a coupling transformer T5 with its primary winding between the conductor 17 and a tapping point on resistor R1, the ends of this resistor being connected to the conductors 18a and 18b.

This voltage may be measured by a voltmeter V1. The tapping point on the resistor R1 may be adjustable but pre-set if desired so that the system hereinafter described can provide either equal power dissipation in the two segments of the current path, or any predetermined ratio of power dissipations found in practice to produce optimum results, so far as temperature uniformity in the delivered gob is concerned.

The secondary winding of transformer T5 feeds a bridge circuit rectifier w5—w8 and thence the voltage winding A1v of the monitoring relay A1.

The monitoring relay A1 includes amplifying means (not shown) controlled by the current and voltage winding A1c and A1v to produce movement of an armature operating a movable contact A1a as a function of the electrical resistance afforded by the glass inbetween the electrode 12 on the one hand and the electrodes 13a and 13b on the other hand. When the resistance of the glass is below a predetermined value or below the lower limit of a predetermined range of values the movable contact is caused to engage the fixed contact A1L (which ultimately result in the voltage between the electrode 12 and the electrodes 13a and 13b being lowered) while if the resistance of the glass is above a predetermined value or above the upper limit of a predetermined range of values the contact A1a engages the contact A1R (which will ultimately result in the voltage between the electrode 12 and the electrodes 13a and 13b being raised) whereby departure from the desired operating conditions is corrected automatically. When the glass resistance has the desired value, the movable contact A1a assumes the neutral position shown in FIG. 6 in which it is spaced from both fixed contacts A1R and A1L. Terminals 30 and 31 for monitoring relay A1 are connected to an alternating current supply which serves to energise the amplifier means incorporated in this relay and also the motors for effecting automatic adjustment of the transformers T4a and T4b as hereinafter described.

One type of monitoring relay which would be suitable is known as a force balance relay or computer.

The motors M1a and M1b are of the reversible type having three terminals, one of which is connected, in each case, through a common conductor 22 to one of the terminals 23 and 24, supplied from single phase A.C. mains.

The other terminal 24 of these mains is connected to each motor alternatively, one or other of its two remaining terminals providing for rotation in respectively opposite directions and in such a way that the motors can be energised either to rotate both in the same direction that is to raise the voltage supplied by the transformers T4a and T4b, or lower such voltages or, alternatively, to rotate in opposite directions so as to provide corresponding adjustments of the two voltages supplied by the transformers T4a and T4b in opposite directions.

For this purpose relays A2R and A2L are provided as well as relays A3 and A4.

The energising winding of relay A2R is connected between terminals 23 and 24 through the intermediary of contacts A1R and A1a whilst the energising winding of relay A2L is similarly connected through the intermediary of contacts A1L and A1a so that according to the setting of the monitoring relay A1, neither, or either, of the relays A2R and A2L are energised.

Also, in series with the energising windings of these last mentioned relays is an adjustable time delay relay A5, the purpose of which is to prevent short term or random variations in the input applied to the monitoring relay A1 producing undesired energisation of either A2R or A2L.

The three terminals of the motor M1a are designated 25 and 25R and 25L, whilst the terminals of the motor M1b are similarly designated 26 and 26R and 26L, the significance of the suffixes R and L being that these terminals are energised when it is desired that the motors concerned should respectively raise and lower the voltages of their associated transformers T4a and T4b.

Terminal 25R is connected with terminal 24 alternatively through contacts A2Ra or through contacts A3a, the terminal 25L is similarly connected alternatively with terminal 24 through contacts A2La and A4a.

The terminals 26R and 26L are similarly connected with the terminal 24 through the intermediary of similar contacts pertaining to the same relays and identified by like references in which the suffix "b" is substituted for the suffix "a."

Energisation of the relays A3 and A4 is controlled by a spring centred key switch S1 having fixed contacts S1a and S1b and movable contact S1c normally held open with respect to both the fixed contacts but displaceable manually to close with respect to either of them. Movable contact S1c is connected directly by conductor 27 to terminal 24 of the incoming A.C. supply.

It will be evident from the foregoing description that the system provides for automatic adjustment of the transformers T4a and T4b so that voltages supplied by these may either both be raised or both be lowered, whereas if it is desired to raise the voltage provided by transformer T4a, or lower this, whilst respectively lowering and raising the voltage produced by transformer T4b, this is done by manually operating the movable contact S1c closed with respect to one or the other of the contacts S1a and S1b. The manner in which the motors M1a and M1b are energised under these conditions will be apparent from a study of the circuit diagram.

If it is desired to dispense with the automatic adjustment of voltage provided by transformers T4a and T4b, whereby these are both raised or both lowered, use may be made of a further spring centred key switch S2 having fixed contacts S2R and S2L and a movable contact S2c operated manually. This key switch S2 can be brought into the circuit and the automatic control system can be cut out of the circuit by a changeover switch S4 having movable contacts S4R and S4L operating between fixed contacts S4R1, S4R2, S4L1 and S4L2.

Yet another spring centred key switch S5 may be provided to control the operation and direction of operation of motor M2 which is associated with the variable autotransformer T6 to adjust same. The fixed contacts S5a and S5b are connected to two terminals of the motor M2 to provide rotation in opposite directions respectively when energised, whilst the movable contact S5c is connected with one of the supply terminals 28, 29 the other being connected to the remaining terminal of the motor M2.

The user of the furnace may decide whether to set the movable contact S1c of the switch S1 closed with respect to the fixed contacts S1a or S1b according to whether, in expelling a gob through the opening 11, the gob tends to be deflected in the direction of the longitudinal centre line of the chamber 10 towards the electrode 13a, or toward the electrode 13b. It will tend to be deflected towards the electrode in the vicinity of which the glass is of greater viscosity and lower temperature and, therefore, the remedy is to increase the voltage difference between this electrode and the electrode 12 by the appropriate setting of the switch S1 to adjust transformers T4a and T4b in opposite directions.

Detection of departure from the proper relative values of current density at one side of the feeding chamber relatively to the other along the axis 87 (FIGURE 5) may be effected by observing the gob expelled from the outlet 11. The gob will tend to incline towards the side where the glass is coldest and the current density lowest since more glass will be forced out of the outlet 11 on the other side where the glass is of higher temperature and less viscous.

Consequently the electrode 13b needs to be moved towards the side of the feeding chamber towards which the gob inclines if there is any lateral asymmetry observed during expulsion of the gob.

If it is desired to measure the conditions of the glass at opposite sides of the reference axis 84 and along the reference axis 87, this would be done by providing electrodes additional to those illustrated on the axis 87 and measuring the resistance of glass between these and the companion electrode 12 by measurement of current and voltage values in circuits containing these additional electrodes and the electrode 12.

However, in operation visual observation of the symmetry or otherwise of the gob is found satisfactory.

It will of course also be evident that the voltage per unit length of the glass applied between electrode 13a and its companion electrode 12 and electrode 13b and its companion electrode 12 may be varied by vertical adjustment of the electrode utilising the associated pedestals 56a and 56b for this purpose.

Thus, instead of providing transformers T4a, T3a and T4b, T3b, the motors M1a and M1b could be utilised to drive the lower threaded posts 57a and 57b through the intermediary of any suitable transmission means.

Referring now to FIGURE 7 there is shown therein a modification enabling correction for departure from desired current density relationships along the axis 85 to be corrected automatically.

In this modification the manually operable switch S1 of FIGURE 6 is replaced by a monitoring relay A6 which may be similar to the relay A1, but provided with two sets of windings A6Va, A6Ca, A6Cb, and A6Vb.

The windings incorporating the letter C pertain to current and those incorporating the letter V to voltage quantities derived respectively from the electrodes 13a and 13b of their associated supply circuits, the arrangement being such that the magnetically actuated movable contact A6A is moved on to the fixed contact A6a or A6b according to whether the influences of windings bearing the suffix b or windings bearing the suffix a of the monitoring relay A6 predominates.

These windings are supplied in the case of the current windings from current transformers T7a and T7b through rectifier bridge circuits w9—w12 in one case and w13—w16 in the other case.

The voltage windings of the monitoring relay A6 are supplied from voltages appearing across resistors R2a and R2b of which a pre-set variable proportion can be tapped off by the sliders to rectifier bridge circuits w17—w20 in one case and w21—w24 in the other case.

The remaining parts of the circuit may be as illustrated in FIGURE 6.

Referring now to FIGURE 8 this illustrates an electrode arrangement applicable to a feeding chamber 10 provided with two orifices $11_1$, $11_2$.

In this arrangement electrodes 13a and 13b would be provided as before and a circuit arrangement could be adopted identical with that shown in FIGURE 6, with or without the modification of FIGURE 7. In effect this would provide control of the distribution of current density in segments disposed at angularly spaced positions about the central area or region containing the two outlets $11_1$, $11_2$.

However, if it is desired that individual control as to current density distribution should be effected in relation to each of these outlets, a central electrode 13c may be provided, this being connected by way of the conductor 18c to transformer T1.

The supply circuit may be otherwise as shown in FIGURE 6 with the exception that if desired individual manual or automatic control may be provided for the motors M1a and M1b to permit the voltage between electrode 13a and its companion electrode 12 to be raised or lowered without changing that between electrode 13b and its companion electrode 12 and vice versa.

The need for correction may also be judged visually by observing whether gobs delivered from the outlet are hotter at one side than the other, in which case appropriate correction may be made either by operation of the switch S1 or of the operating member for displacing the electrode 13b from side-to-side according to whether the inequality of temperature exists along the longitudinal axis of symmetry of the furnace chamber or from side-to-side of the furnace chamber.

Similarly, these criteria may be applied by the user to effect the requisite correction in the case where two orifices $11_1$ and $11_2$ are provided as previously described, in this case there being the additional criteria that the size of the gob delivered from the two orifices should be equal. If the sizes are unequal, the voltage of the electrode 13a or 13b nearest the smaller sized gob would be raised relatively to the electrodes $12_1$ and $12_2$ (surrounding outlets $11_1$ and $11_2$ respectively and both connected to conductor 17) so as to raise the temperature in the immediate vicinity of such electrode 13a or 13b to reduce the viscosity and hence restore the gob to appropriate size. It will be understood that in this arrangement substantially identical plungers could be provided in association with each orifice 11 so that inequality in the viscosity of the glass delivered by the two plungers respectively, and hence also in the temperature between the glass which forms the gobs respectively may be avoided.

What we claim then is:

1. In a glass feeding furnace including a side wall and a bottom wall defining a feeding chamber, said bottom wall having an outlet for delivery of a body of glass from said chamber, the furnace further including means acting in axial alignment with the said outlet for impelling the discharge of gobs of glass from said outlet; the provision of means for controlling the temperature of said body at positions around a reference axis extending upwardly through said outlet comprising, lower electrode means disposed in the vicinity of said outlet and having a current communicating face surrounding said reference axis, upper electrode means in said chamber and disposed in a zone surrounding said reference axis, said upper electrode means including a plurality of upper electrodes having respective downwardly presented current communicating faces collectively occupying at least half the circumferential length of said zone, means for feeding current to said upper and lower electrode means to pass such current through the glass in a path extending generally lengthwise of and surrounding said reference axis, supporting means for said upper electrodes, and means incorporated in said supporting means for adjusting the position of at least one of said upper electrodes relative to another one of said electrodes in a direction extending parallel to said axis to vary the density of said current in the glass in one segment of the current path relatively to another segment thereof.

2. In a glass feeding furnace including a side wall and a bottom wall defining a feeding chamber said bottom wall having an outlet for delivery of a body of glass from said chamber, the furnace further including means acting in axial alignment with the said outlet for impelling the discharge of gobs of glass from said outlet; the provision of means for controlling the temperature of said body at positions around a reference axis extending upwardly through said outlet comprising, a lower electrode disposed in the vicinity of said outlet and in contact with glass contained in said chamber, upper electrode means in said chamber and disposed in an annular zone surrounding said reference axis, said upper electrode means including a plurality of upper electrodes spaced apart angularly about said reference axis and having current communicating faces presented generally towards said lower electrode and collectively occupying at least half the circumferential length of said zone, means for feeding current in a plurality of separate circuits each including said lower electrode and respectively including said upper electrodes, to pass current through the glass in a plurality of adjacent segmental paths between said lower electrode and said upper electrodes and collectively surrounding said reference axis, and means for varying the voltage in one of said circuits between said lower electrode and one of said upper electrodes relatively to the voltage in at least one other of said circuits between said lower electrode and a corresponding other one of said upper electrodes.

3. In a glass feeding furnace including a side wall and a bottom wall defining a feeding chamber said bottom wall having an outlet for delivery of a body of glass from said chamber; the provision of means for controlling the temperature of said body at positions around a reference axis extending upwardly through said outlet comprising, lower electrode means disposed in the vicinity of said outlet and in contact with glass contained in said chamber, upper electrode means in said chamber and disposed in a zone surrounding said reference axis, said upper electrode means including a plurality of upper electrodes spaced apart angularly about said reference axis and having current communicating faces presented generally towards said lower electrode means and collectively of an area to occupy a substantial proportion of the area of said zone, a source of alternating voltage for feeding alternating current in a plurality of circuits each including said lower electrode means and respectively including said upper electrodes, to pass current through the glass in a plurality of respective segmental paths between said lower electrode means and said upper electrodes and collectively surrounding said reference axis, monitoring means responsive to electrical resistance presented by at least one of said paths in the glass, control means operatively connected with said monitoring means for varying the electrical voltage applied per unit length of the path between said lower electrode means and one of said upper electrodes relatively to that applied between said lower electrode means and another one of said upper electrodes.

4. A glass feeding furnace including a side wall and a bottom wall defining a feeding chamber, said bottom wall having an outlet for delivery of a body of glass from said chamber, means acting in axial alignment with the said outlet for impelling the discharge of gobs of glass from said outlet, lower electrode means disposed in the vicinity of said outlet and in contact with glass contained in said chamber, upper electrode means in said chamber and disposed in an annular zone surrounding a reference axis extending upwardly through said outlet, said upper electrode means including a plurality of upper electrodes having current communicating faces presented generally towards said lower electrode means and collectively occupying at least half the circumference of said zone, means for feeding current to said upper and lower electrode means to pass such current through the glass in a path extending generally lengthwise of and surrounding said reference axis, supporting means for said upper electrodes and means incorporated in said supporting means for adjusting the position of one of said upper electrodes relative to another one of said electrodes in a direction transverse of said axis.

5. A glass feeding furnace including a side wall and a bottom wall defining a feeding chamber having an entry thereto for glass, said bottom wall having an outlet, an elongated plunger in said chamber extending longitudinally along a reference axis extending upwardly through said outlet, means for longitudinally reciprocating said plunger toward and away from said outlet to deliver gobs of glass from said outlet, lower electrode means disposed in the vicinity of said outlet and in contact with glass contained in said chamber, upper electrode means in said chamber and disposed in a zone surrounding said reference axis, said upper electrode means including a plurality of upper electrodes spaced apart angularly about said reference axis and having current communicating faces presented generally towards said lower electrode means and collectively of an area to occupy a substantial proportion of the area of said zone, a source of alternating voltage in circuit with said electrode means for feeding alternating current to said upper and lower electrode means to pass such current through the glass in a path extending generally lengthwise of and surrounding said plunger, and means for varying the electrical voltage per unit length of said path applied between said lower electrode means and at least one of said upper electrodes relatively to that applied between said lower electrode means and at least one other of said upper electrodes.

6. A glass feeding furnace including a side wall and a bottom wall defining a feeding chamber having an entry thereto for glass, said bottom wall having an outlet, an elongated plunger in said chamber extending longitudinally along a reference axis extending upwardly through said outlet, means for reciprocating said plunger toward and away from said outlet to deliver gobs of glass from said outlet, lower electrode means disposed in the vicinity of said outlet and having a current communicating face surrounding said reference axis, upper electrode means in said chamber and disposed in a zone surrounding said plunger, said upper electrode means including a plurality of upper electrodes spaced apart angularly about said reference axis and having current communicating faces presented generally towards said lower electrode means and collectively of an area to occupy a substantial proportion of the area of said zone, a source of alternating voltage in circuit with said electrode means for feeding alternating current to said upper and lower electrode means to pass such current through the glass in a path extending generally lengthwise of and surrounding said plunger, supporting means for said upper electrodes, and means incorporated in said supporting means to enable at least one of said upper electrodes to be positionally adjusted in a direction to vary its spacing in relation to said reference axis to vary the density of said current in the glass in one segment of the current path relatively to another segment thereof.

7. A glass feeding furnace including a side wall and a bottom wall defining a feeding chamber having an entry thereto for glass, said bottom wall having an outlet, an elongated plunger in said chamber extending lonitudinally along a reference axis extending upwardly through said outlet, means for reciprocating said plunger toward and away from said outlet to deliver gobs of glass from said outlet, lower electrode means disposed in the vicinity of said outlet and having a current communicating face surrounding said reference axis, upper electrode means in said chamber and disposed in a zone surrounding said reference axis, said upper electrode means including a plurality of upper electrodes spaced apart angularly about said reference axis and having current communicating faces presented generally towards said lower electrode means and collectively of an area to occupy a substantial proportion of the area of said zone, a source of alternating voltage for feeding alternating current in a plurality of circuits each including said lower electrode means and respectively including said upper electrodes, to pass current through the glass in a plurality of respective segmental paths between said lower electrode means and said upper electrodes and collectively surrounding said plunger, and means for varying the voltage applied in said circuits between said lower electrode means and one of said upper electrodes relatively to another one of said upper electrodes.

8. In a glass feeding furnace, a side wall and a bottom wall defining a chamber, said bottom wall having an outlet for delivery of a body of glass from said chamber in the direction of a reference axis extending through said outlet, the latter having an outer boundary inset laterally from said side wall; means acting in axial alignment with the said outlet for impelling the discharge of gobs of glass from said outlet a lower electrode adjacent said outlet and having a current communicating face in said chamber, said face extending in an annular zone about said axis; a plurality of separate upper electrodes in said chamber axially spaced from said lower electrode and having respective current communicating faces angularly spaced about said axis in an annular zone and extending laterally outwardly beyond said outer boundary of said outlet and jointly extending over at least one half of the circumference of said annular zone; a source of electric current; a plurality of control circuits, each circuit being connected to said source and to a respective one of said faces for passage of current through said chamber in a plurality of separate axially extending paths between said lower electrode and respective faces of said upper electrode means; and means in said control circuits for varying the density of a current passing in one of said paths relative to the density of the current passing in another one of said paths.

9. In a glass feeding furnace, a side wall and a bottom wall defining a chamber, said bottom wall having a plurality of outlets for delivery of respective bodies of glass from said chamber in the direction of respective reference axes extending through said outlets; means acting in axial alignment with at least one of said outlets for impelling the discharge of gobs of glass from said one outlet; a lower electrode adjacent each of said outlets, each of said electrodes having a current communicating face in said chamber, said face extending in an annular zone about the respective axis; a plurality of upper electrodes in said chamber axially spaced from corresponding ones of said lower electrodes, said upper electrode means each including a plurality of current communicating faces angularly spaced about the respective axis in an annular zone and jointly extending over substantially one half of the circumference of the last mentioned zone; a source of electric current in circuit with said faces for passage of current through said chamber between said lower electrodes and the plurality of faces of the corresponding upper electrode means in a plurality of separate axially extending respective paths, and means for varying the density of a current passing in one of said paths relative to the density of the current passing in another one of said paths.

10. A method of forming a body of glass having a controlled temperature distribution, comprising the steps of forming a tubular body of molten glass having an axis and an axially extending cavity; axially passing a plurality of electrical currents through said body in respective circumferentially offset paths so as to heat segmental portion of said body about said cavity by respective ones of said currents; monitoring the temperature of one of said segmental portions; adjusting the magnitude of said current in said one portion relative to the magnitude of the current in another one of said portions responsive to the sensed temperature; and radially collapsing said cavity to form a solid body of glass from said segmental portions.

References Cited in the file of this patent

UNITED STATES PATENTS

| | | |
|---|---|---|
| 1,375,336 | Wadsworth | Apr. 19, 1921 |
| 1,680,543 | Howard | Aug. 14, 1928 |
| 1,999,744 | Wadman | Apr. 30, 1935 |
| 2,276,295 | Ferguson | Mar. 17, 1942 |
| 2,790,019 | Stalego | Apr. 23, 1957 |
| 2,830,107 | Hahn et al. | Apr. 8, 1958 |
| 2,913,509 | Pinotti | Nov. 17, 1959 |

FOREIGN PATENTS

| | | |
|---|---|---|
| 671,405 | Great Britain | May 7, 1952 |